(12) United States Patent
Verosub

(10) Patent No.: US 8,346,762 B2
(45) Date of Patent: Jan. 1, 2013

(54) CREATION, MANAGEMENT AND DELIVERY OF MAP-BASED MEDIA ITEMS

(75) Inventor: Ellis M. Verosub, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 452 days.

(21) Appl. No.: 11/621,544

(22) Filed: Jan. 9, 2007

(65) Prior Publication Data

US 2008/0040328 A1 Feb. 14, 2008

Related U.S. Application Data

(60) Provisional application No. 60/836,285, filed on Aug. 7, 2006.

(51) Int. Cl.
*G06F 7/00* (2006.01)
*G06F 17/30* (2006.01)

(52) U.S. Cl. ........................................ 707/722; 707/756

(58) Field of Classification Search .................... 707/10, 707/722, 756; 701/202
See application file for complete search history.

(56) References Cited

U.S. PATENT DOCUMENTS

| | | | |
|---|---|---|---|
| 5,649,186 A | 7/1997 | Ferguson | |
| 2003/0079038 A1 | 4/2003 | Robbin | |
| 2004/0117108 A1 | 6/2004 | Nemeth | |
| 2004/0267816 A1 | 12/2004 | Russek | |
| 2005/0004751 A1* | 1/2005 | Odinak et al. | 701/202 |
| 2006/0123053 A1 | 6/2006 | Scannell | |
| 2006/0168150 A1 | 7/2006 | Naik | |
| 2006/0265409 A1 | 11/2006 | Neumann | |
| 2006/0265503 A1 | 11/2006 | Jones | |
| 2006/0265637 A1 | 11/2006 | Marriott | |
| 2007/0050128 A1* | 3/2007 | Lee et al. | 701/200 |
| 2007/0079327 A1 | 4/2007 | Khoo et al. | |
| 2007/0130594 A1 | 6/2007 | Hidary et al. | |
| 2007/0150502 A1 | 6/2007 | Bloebaum et al. | |
| 2007/0168112 A1* | 7/2007 | Ratliff et al. | 701/200 |
| 2007/0198353 A1 | 8/2007 | Behringer et al. | |
| 2007/0214485 A1* | 9/2007 | Bodin et al. | 725/101 |
| 2007/0220048 A1 | 9/2007 | Ott | |
| 2007/0282521 A1* | 12/2007 | Broughton | 701/200 |
| 2008/0046948 A1 | 2/2008 | Verosub | |

OTHER PUBLICATIONS

"Making your First Podcast", www.podcastingnews.com/articles/How/to/Podcast.html, Jul. 21, 2006, pp. 1-2.
"GarageBand Support Working with Podcasts", www.apple.com\support\garageband\podcasts, downloaded Jun. 14, 2007, pp. 1-3.
"GarageBand3, Getting Started", copyright 2006, pp. 1-98.
"iPod Directions: Use your iPod Video, Nano or Photo as a Yahoo! Maps direction viewer!", www.ipod-directions.com, download Dec. 6, 2006, pp. 1-2.

(Continued)

*Primary Examiner* — Fred I Ehichioya
*Assistant Examiner* — Kris Mackes

(57) ABSTRACT

Improved techniques to facilitate generation, management and delivery of personalized media items for users are disclosed. Users are able to influence or control content within a personalized media item. According to one aspect, personalized media items can pertain to generation and delivery of map-based media items. These media items are playable by a media playback device. For example, when a map-based media item is played by a media playback device, an audio output and/or a visual output can be provided. The audio output can be provided by digital audio, and the visual output can be provided by at least one digital image that is associated with at least a portion of the digital audio.

29 Claims, 8 Drawing Sheets

OTHER PUBLICATIONS

Zawodny, "iWay Puts Yahoo! Maps on Your iPod", www.jeremy.zawodny.com/blog/archives/005489.html, Oct. 7, 2005, pp. 1-4.
"Podcasting and iTunes: Frequently Asked Questions", www.apple.com/itunes/podcasts/faq.html, downloaded Jul. 22, 2006, pp. 1-3.
U.S. Appl. No. 11/621,541, entitled "Creation, Management and Deliver of Personalized Media Items", filed Jan. 9, 2007.
Office Action for U.S. Appl. No. 11/621,541, mailed Mar. 5, 2009.
Office Action for U.S. Appl. No. 11/621,541, mailed Oct. 15, 2009.
Office Action for U.S. Appl. No. 11/621,541 mailed Mar. 4, 2010.
Final Office Action for U.S. Appl. No. 11/621,541 mailed Oct. 6, 2010.
International Search Report and Written Opinion for PCT Application No. PCT/US2007/075195, mailed Dec. 17, 2007.
Office Action for U.S. Appl. No. 11/621,541, mailed Mar. 3, 2011.
Final Office Action for U.S. Appl. No. 11/621,541, mailed Dec. 9, 2011.
Office Action for U.S. Appl. No. 11/621,541, mailed Sep. 12, 2012.

* cited by examiner

CREATION, MANAGEMENT AND DELIVERY OF MAP-BASED MEDIA ITEMS

CROSS-REFERENCE TO RELATED APPLICATIONS

This application claims priority benefit of U.S. Provisional Patent Application No. 60/836,285, filed Aug. 7, 2006, and entitled "CREATION, MANAGEMENT AND DELIVERY OF PERSONALIZED MEDIA ITEMS," which is hereby incorporated by reference herein.

This application is related to U.S. patent application Ser. No. 11/621,541, filed Jan. 9, 2007, and entitled "CREATION, MANAGEMENT AND DELIVERY OF PERSONALIZED MEDIA ITEMS," which is hereby incorporated by reference herein.

BACKGROUND OF THE INVENTION

1. Field of the Invention

The present invention relates to media items and, more particularly, to creation, acquisition and playback of personalized media items.

2. Description of the Related Art

A media player stores media assets, such as audio tracks, that can be played or displayed on the media player. One example of a portable media player is the iPod® media player, which is available from Apple Computer, Inc. of Cupertino, Calif. Often, a media player acquires its media assets from a host computer that serves to enable a user to manage media assets. In managing media assets, a user can create playlists for audio tracks. These playlists can be created at the host computer. Media assets within the playlists can then be copied to the media player. As an example, the host computer can execute a media management application to acquire and manage media assets. One example of a media management application is iTunes® produced by Apple Computer, Inc.

Podcasts are typically used to share content from websites. Podcasts are associated with Really Simple Syndication (RSS) feeds which use a lightweight XML format. A podcast can be organized into episodes much like a radio or television program. An interested person can subscribe to receive podcast episodes that are subsequently published. This is achieved by the interested person using their computer to access a podcast website (i.e., subscription server) that hosts the RSS feed. The interested person can then subscribe to the RSS feed such that their computer occasionally re-visits the podcast website to check for any new podcast episodes. Typically, if a new podcast episode is available, it is downloaded to the computer. Thereafter, the interested user can play the podcast episode at their computer in the same manner as other audio files (e.g., MP3 files). A utility program can be used to download the audio files to a portable media player (e.g., MP3 player). One example of such a conventional utility program is "iPodder" which is a small program that runs on one's computer to download audio files to one's portable media player.

Conventionally, the media content within podcasts are fixed when made available to subscribers. In other words, a subscriber can choose to subscribe to a particular podcast from a plurality of established podcasts. However, a subscriber has no control over the content provided in or with podcasts. Unfortunately, however, a subscriber may desire a podcast that is somewhat different from the available podcasts. In many cases, a subscriber is not interested in the entire pre-established podcast but would prefer to modify the podcast in some manner. However, there is currently no way for a subscriber to alter the content within a podcast.

Thus, there is a need for improved techniques to enable podcast users to have greater control over the content provided in or with podcasts.

SUMMARY OF THE INVENTION

The invention pertains to the generation, management and delivery of personalized media items for users. Users are able to influence or control content within a personalized media item.

According to one aspect of the invention, personalized media items can pertain to generation and delivery of map-based media items. These media items are playable by a media playback device. For example, when a map-based media item is played by a media playback device, an audio output and/or a visual output can be provided. The audio output can be provided by digital audio, and the visual output can be provided by at least one digital image that is associated with at least a portion of the digital audio.

The invention can be implemented in numerous ways, including as a method, system, device, apparatus (including graphical user interface), or computer readable medium. Several embodiments of the invention are discussed below.

As a computer-implemented method for forming a map-based media item, one embodiment of the invention includes at least the acts of: receiving a request for a map-based media item pertaining to mapping a route from a start location to a destination location; obtaining map information based on a determined route from the start location to the destination location, the map information including text directions and at least one map image; causing the text directions to be converted into voice directions; and forming the map-based media item using at least the voice directions and the at least one map image.

As a computer-implemented method for providing a map-based media item to a portable media playback device, one embodiment of the invention includes at least the acts of: receiving a request for a map-based media item pertaining to mapping a route from a start location to a destination location; obtaining map information based on a determined route from the start location to the destination location, the map information including text directions and a plurality of map images; causing the text directions to be converted into voice directions; forming a map-based media item from the voice directions and the map images, the map images being at least partially synchronized with the corresponding portions of the voice directions; and rendering the map-based media item available to be provided to the portable media playback device.

As a computer-readable medium including at least computer program code for providing a map-based media item to a media playback device, one embodiment of the invention includes at least: computer program code for receiving a request for a map-based media item pertaining to mapping a route from a start location to a destination location; computer program code for obtaining map information based on a determined route from the start location to the destination location, the map information including text directions; computer program code for causing the text directions to be converted into voice directions; and computer program code for forming the map-based media item using at least the voice directions.

As a computer-implemented method for providing map-based media data to a client device, one embodiment of the invention includes at least the acts of: requesting map-based media data from a remote server, the map-based media data pertaining to mapping a route from a start location to a destination location; receiving an indication that the map-based media data that has been requested has been made available on a subscription server; requesting the map-based media data from the subscription server; receiving at least a portion of the map-based media data from the subscription server in response to a request therefor; storing the received map-based media data; and subsequently downloading the received map-based media data to the portable media playback device.

As a computer system one embodiment of the invention includes at least: a processor for executing computer program code to form one or more map-based media items, and a data storage device that stores one or more map-based media items and the computer program code. The computer program code includes at least: computer program code for obtaining map information based on a route from a start location to a destination location, the map information including text directions; computer program code for causing the text directions to be converted into voice directions; and computer program code for forming the map-based media item using at least the voice directions.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to the generation, management and delivery of personalized media items for users. Users are able to influence or control content within a personalized media item.

According to one aspect of the invention, personalized media items can pertain to generation and delivery of map-based media items. These media items are playable by a media playback device. For example, when a map-based media item is played by a media playback device, an audio output and/or a visual output can be provided. The audio output can be provided by digital audio, and the visual output can be provided by at least one digital image that is associated with at least a portion of the digital audio.

Embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1:
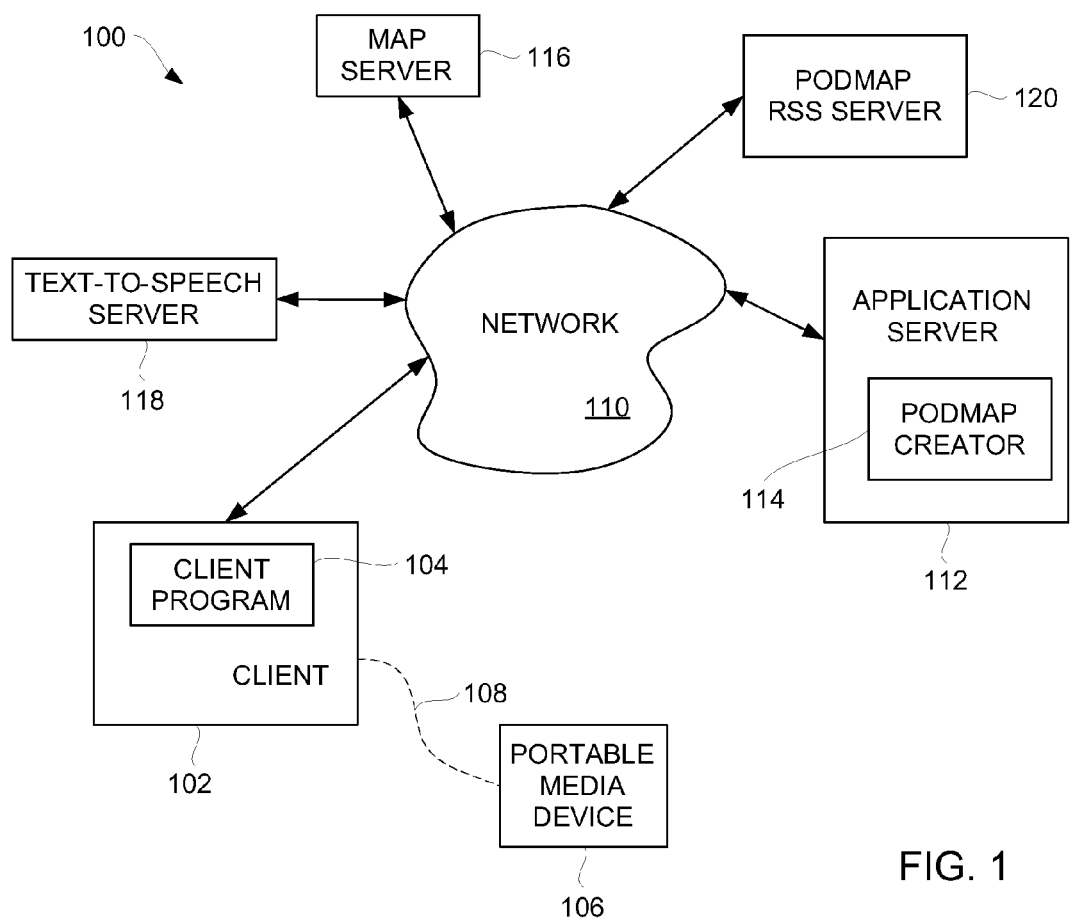
FIG. 1 is a block diagram of a map-based media system according to one embodiment of the invention.

FIG. 1 is a block diagram of a map-based media system 100 according to one embodiment of the invention. The map-based media system 100 supports a plurality of clients 102, though only a single client 102 is depicted in FIG. 1. The client 102 is typically a computing device, such as a personal computer. The client 102 includes a client program 104 that operates on the client 102. In one embodiment, the client program 104 can pertain to a media management application. The media management application can operate to facilitate storage, acquisition and management of media items on the client 102. One example of a media management program is iTunes® media program available from Apple Computer, Inc. which can include a Really Simple Syndication (RSS) reader. In another embodiment, the client program 104 can include a network browser and a RSS reader.

A portable media device 106 can also be connected to the client 102 over a link 108. The link 108 can be a wired link or a wireless link. The portable media device 106 is typically a hand-held or otherwise small and highly portable computing device. Examples of the portable media device 106 include a media player (e.g., music player), a PDA, a mobile telephone, etc.

The client 102 is able to couple to, and thus communicate with, a network 110, typically a data network. The network 110 is typically a global computer network, such as the World Wide Web (WWW) or the Internet. However, the network 110 can also be a wide area network or a local area network. The network 110 can include wired and/or wireless networks or sub-networks.

The map-based media system 100 also includes an application server 112 coupled to the network 110. The application server 112 is primarily responsible for production of map-based media items. In particular, the application server 112 includes a podmap creator 114. The podmap creator 114 operates to produce the map-based media items. In this regard, the map-based media items can also be referred to as podmaps (or mapcasts) as they are or can be considered to be podcasts pertaining to map information. A podcast is a particular type of media file, typically an audio, video or multimedia file that can include or have metadata associated therewith. The metadata describes attributes of the podcast, such as title, description, chapter names, and images (graphics). A podcast can refer to or be associated with media content (e.g., a television show) that has episodes (e.g., periodic episodes). The episodes are the podcasts or portions thereof that can be played. More specifically, media data for the episodes can be played, thereby playing the podcasts. Additional details on the operation of the application server 112 and/or the podmap creator 114 are discussed in greater detail below.

To assist the application server 112 in producing the podmaps, the map-based media system 100 can include a map server 116, a Text-To-Speech (TTS) server 118, and a podmap RSS server 120. The map server 116 provides access to a map database that can be queried to obtain map information. The TTS server 118 provides text-to-speech conversion. The podmap RSS server 120 is a server that can host podmaps so that clients 102 (e.g., RSS readers therein) are able to acquire their requested podmaps.

The map-based media system 100 can produce podmaps on request by the client 102. For example, a podmap can be requested by the client program 104 operating on the client 102. The podmap request can then be sent via the network 110 to the application server 112. The podmap request received at the application server 112 includes, in one embodiment, a start location and a destination location. The application server 112 can request map information from the map server 116. Typically, the application server 112 would forward the start location and the destination location to the map server 116. The map server 116 would then query its map database to determine the map information that assists a user from going from the start location to the destination location. Normally, the map information includes text directions and one or more images pertaining to a route that has been selected for travel from the start location to the destination location. The application server 112 can also cause the text directions from the map information to be converted into voice directions. In this regard, the application server 112 can interact with the TTS server 118. In particular, the application server 112 can forward the text directions to the TTS server 118. Then, at the TTS server, the text directions can be converted into voice directions and returned back to the application server 112. The podmap creator 114 can then operate to create the podmap being requested using at least the one or more images from the map information and the voice directions associated with the text directions. Thereafter, the podmap can be stored on the podmap RSS server 120. While stored at the podmap RSS server 120, the podmap is able to be accessed and acquired by the client 102 via the network 110. In this regard, the application server 112 can reply to the client program 104 to notify the client 102 that the requested podmap is now available from the podmap RSS server 120. The client program 104 can then interact with the podmap RSS server 120 to retrieve the requested podmap.

Furthermore, once the client program 104 includes the requested podmap, the client program 104 can transfer or copy the podmap to the portable media device 106. In any event, once the requested podmap is resident at the client 102 or the portable media device 106, the podmap is able to be played on such devices. Due to their support of media playback, the client 102 and the portable media device 106 can also be referred to as media playback devices. When being played, the podmap presents to the user of the device the voice directions and the corresponding images so that the user is able to successfully navigate from the start location to the destination location. It is particularly useful to play on the portable media device 106 because it can be easily carried or transferred by the user.

In other embodiments, one or more of the map server 116, the TTS server 118 and the podmap RSS server 120 of the map-based media system 100 can be incorporated into a common server. The application server 112 can also be the common server. In still another embodiment, the TTS server 118 can be combined with the map server 116.

Figure 2:
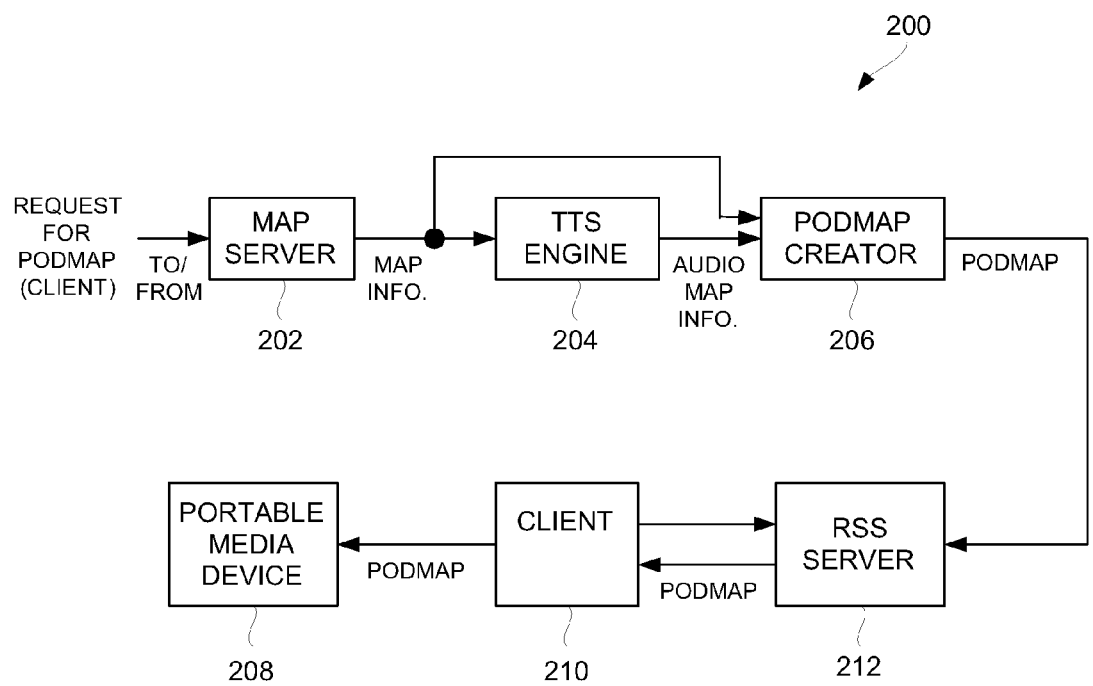
FIG. 2 is a block diagram of a podmap system according to one embodiment of the invention.

FIG. 2 is a block diagram of a podmap system 200 according to one embodiment of the invention. The podmap system 200 provides a representative data flow view for creation and delivery of a podmap. The podmap system 200 can, for example, be provided by the map-based media system 100 illustrated in FIG. 1.

The podmap system 200 initially receives a request for a podmap. The request for the podmap would typically come from a client. In one embodiment, the request for a podmap would include at least "to" and "from" information regarding a start location and a destination location. In another embodiment, the request for a podmap would include at least "to" information regarding a destination, with the start location being previously known or determined without user input. The to/from information would be provided to a map server 202 to acquire map information. In one embodiment, the map information includes text map information and image map information. The text map information from the map server 202 would then be provided to a TTS engine 204. The TTS engine 204 would convert the text map information into audio map information. The TTS engine 204 outputs audio map information to a podmap creator 206. The podmap creator 206 would receive the image map information as well as the audio map information. The podmap creator 206 would then organize and produce a podmap that is personalized in view of the particular request for a podmap. The resulting podmap is then provided to a subscription server 212 (e.g., RSS server) where it is made available for download to a client 210. Typically, the client 210 would request the podmap from the RSS server 212 and then receive the podmap at the client 210. The client 210 can also thereafter download the podmap to a portable media device 208. Once the podmap is stored on the client 210 or the portable media device 208, the podmap can be played to, in effect, present the map information to the user of the client 210 or the portable media device.

Figure 3:
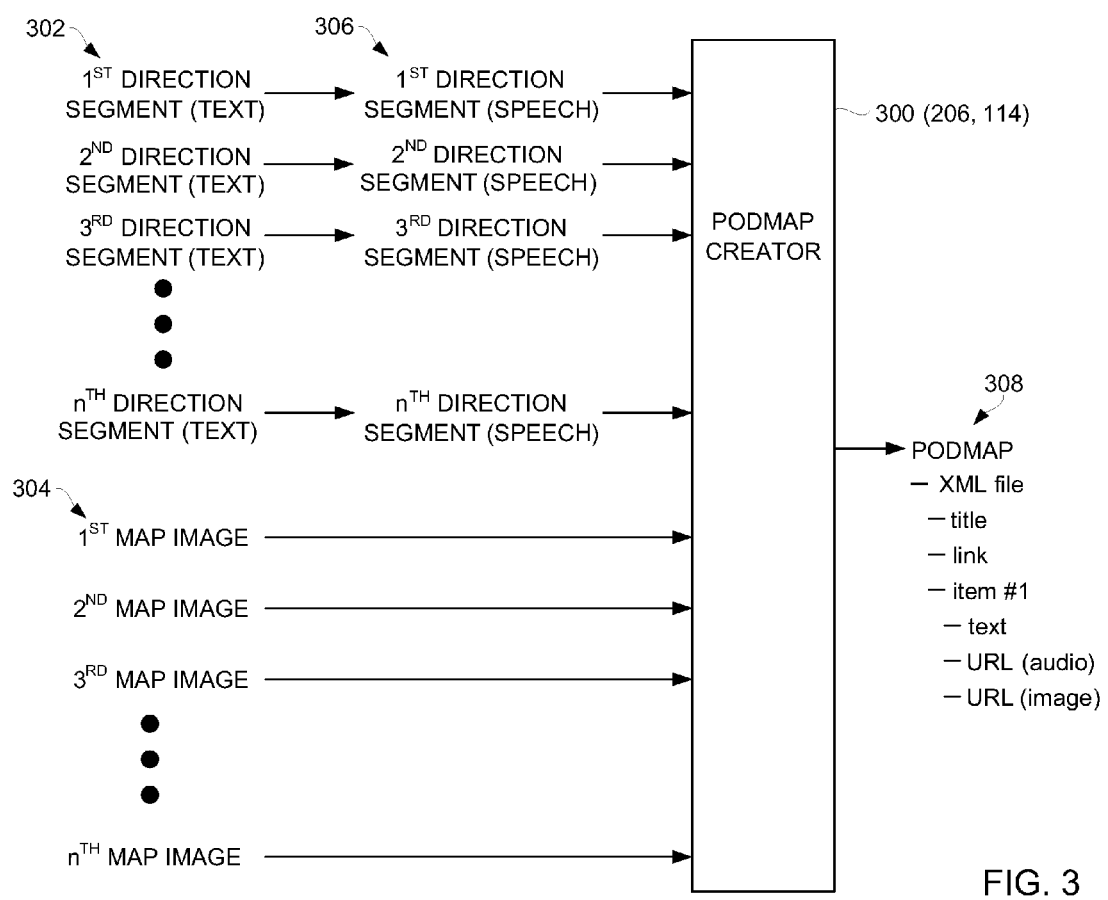
FIG. 3 is a diagram of a podmap creator according to one embodiment of the invention.

FIG. 3 is a diagram of a podmap creator 300 according to one embodiment of the invention. The podmap creator 300 is, for example, suitable for use as one embodiment of the podmap creator 206 illustrated in FIG. 2 or the podmap creator 114 illustrated in FIG. 1. As illustrated in FIG. 3, first, second, third, . . . , nth direction segments 302 and first, second, third, . . . nth map images 304 are utilized. The direction segments 302 are text directions. The direction segments 302 and the map images 304 together can be considered map information, such as map information provided by a map server. The map images 304 are often associated with the direction segments. For example, in one embodiment, the first map image is typically associated with the first direction segment, and the second map image is typically associated with the second direction segment, etc. However, it should be recognized that not all direction segments need to have a corresponding map image, and that a map image might correspond to more than one direction segment.

As depicted in FIG. 3, the podmap creator 300 operates on speech (or other audio inputs) and the map images 304. Hence, the direction segments 302 which are text-based are converted into first, second third, . . . nth direction segments which are speech-based. The speech-based direction segments 306 can then be provided to the podmap creator 300. Using the speech-based direction segments 306 as well as the map images 304, the podmap creator 300 can form a podmap 308. The podmap 308 is, for example, a particular type of podcast that is associated with providing map or navigation information. The podmap 308 is typically a mark-up language file, such as an eXtensible Markup Language (XML) file. The organization of the mark-up language file can vary with implementation. In one implementation, the XML file includes at least a title for the podmap and a link specifying where the RSS feed resides. The link specifies the network location of the RSS feed for the podmap (e.g., location on the podmap RSS server 124, 212).

The podmap 308 can also include one or more items. These items can correspond to different episodes. In one embodiment, the different items correspond to different direction segments. Each of the items can include at least text, such as a title for the item. Each item can also include a link (e.g., Universal Resource Locator (URL)) to audio information, such as the corresponding speech-based direction segment. Each item can also include a link (e.g., URL) to a corresponding map image, if any.

A representative example of a podmap is as follows:

```
<?xml version="1.0" encoding="UTF-8"?>
<rss xmlns:itunes="http://www.itunes.com/DTDs/Podcast-1.0.dtd"
version="2.0">
    <channel>
        <title>My Maps Podcast for Ellis Verosub</title>
        <itunes:author>Apple</itunes:author>
        <description>Personalized podmaps for Ellis
        Verosub</description>
        <language>en-us</language>
        <copyright>Copyright © 2006 Apple Computer,
        Inc.</copyright>
    <item>
        <title>From Cupertino to SJC</title>
        <description>Podmap for directions from 1 Infinite Loop,
Cupertino, to San Jose International Airport</description>
            <enclosure url="http://someserver.apple.com/podcasts/
personalized/ellisverosub/1InfiniteLoopCupertinoCAToSJCCA.m4v"
length="716000" />
            <pubDate>Tue, 18 Jul 2006 05:00:00 GMT</pubDate>
        </item>
        <item>
            <title>From Cupertino to San Francisco</title>
            <description>Podmap for directions from 1 Infinite Loop,
Cupertino, to 1 Market Street, San Francisco</description>
            <enclosure url="http://someserver.apple.com/podcasts/
personalized/ellisverosub/
1InfiniteLoopCupertinoCATo1MarketStreetSanFranciscoCA.m4v"
length="900000" />
            <pubDate>Tue, 18 Jul 2006 07:00:00 GMT</pubDate>
        </item>
    </channel>
</rss>
```

In this representative example the podmap (i.e., the overall podmap) is described by a markup language, namely XML. In this particular example, the podmap contains two episodes (podmap episodes). The first episode pertains to a trip from "San Jose International Airport" to "1 Infinite Loop in Cupertino, Calif.". The second episode pertains to a trip from "1 Infinite Loop, Cupertino, Calif." to "1 Market Street, San Francisco, Calif.". If a new episode is subsequently requested, the representative podmap would be updated to include an additional episode.

The podmap creator 300 is akin to a podcast creator. In one embodiment, a podcast creator can create a podcast from one or more audio, text and possibly image inputs. Various programs are known that assist users in creating podcasts. For example, GarageBand® available from Apple Computer, Inc. can be used to create podcasts.

Figure 4:
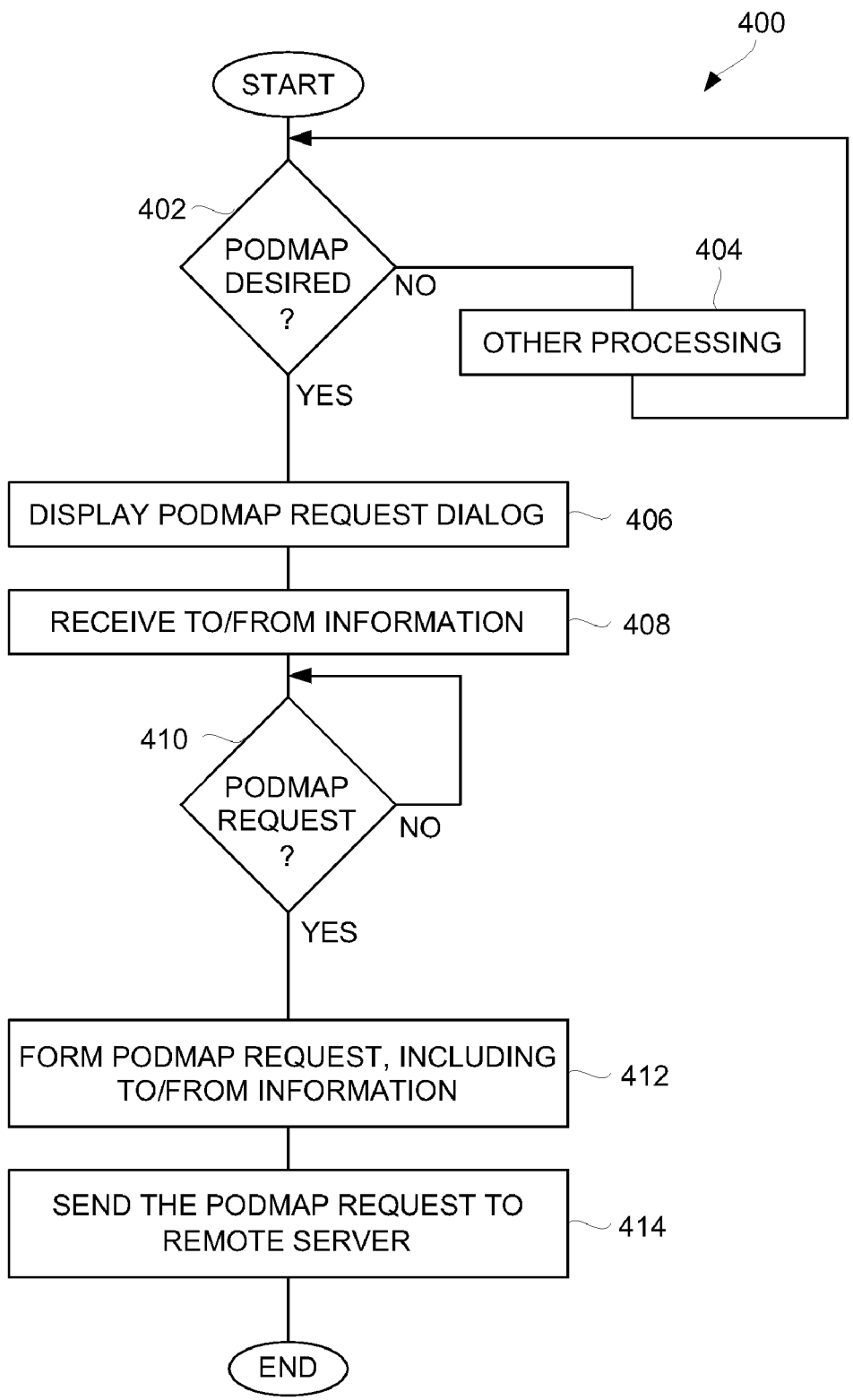
FIG. 4 is a flow diagram of a podmap request process according to one embodiment of the invention.

FIG. 4 is a flow diagram of a podmap request process 400 according to one embodiment of the invention. The podmap request process 400 is, for example, performed by the client program 104 operating on the client 102 illustrated in FIG. 1.

The podmap request process 400 begins with a decision 402. The decision 402 determines whether a podmap is desired. A user of the client 102 can signal their desire to acquire a particular podmap, such as by interaction with a user interface of the client 102. The particular podmap is a personalized podmap for use by the user. When the decision 402 determines that a podmap is not desired, then other processing 404 can be performed. However, when the decision 402 determines that a podmap is desired, a podmap request dialog is displayed 406. Here, the client 102 typically includes a display and the client program 104 operates to cause a podmap request dialog to be displayed 406. In one embodiment, the podmap request dialog enables the user to specify characteristics of a podmap desired by the user. In this regard, to/from information is often received 408. The podmap request can also indicate resolution, size, or length limits or preferences for the podmap. Typically, the podmap request dialog will at least request that the user enter to/from information regarding the podmap that is desired. After the to/from information is received 408, a decision 410 can determine whether a podmap request has been made. Here, in this embodiment, the podmap request is triggered by the user. For example, the user can interact with the podmap request dialog to initiate the podmap request. As an example, the podmap request dialog can include a button region upon which the user can select so as to request the podmap. When the decision 410 determines that a podmap request has not been received, the podmap request process 400 can await such a request.

Once the decision 410 determines that a podmap request has been received, a podmap request (including the to/from information) can be formed 412. The podmap request is then sent 414 to a remote server. Here, the podmap request is a request to the remote server to create and return a podmap in accordance with the to/from information. In one embodiment, the remote server can be the application server 112 illustrated in FIG. 1. Following the block 414, the podmap request process 400 is complete and ends.

Figure 5:
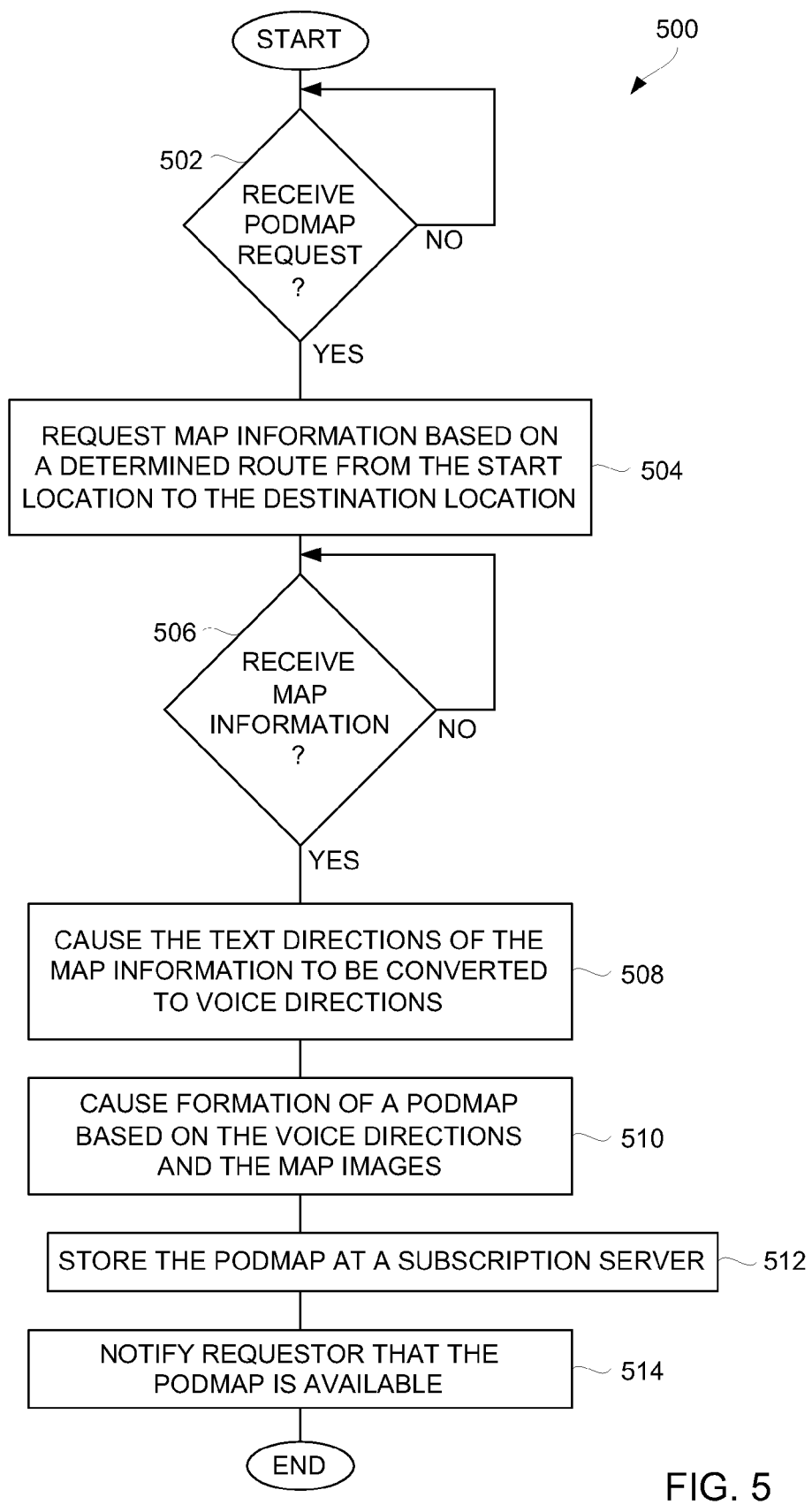
FIG. 5 is a flow diagram of a podmap formation process according to one embodiment of the invention.

FIG. 5 is a flow diagram of a podmap formation process 500 according to one embodiment of the invention. The podmap formation process 500 is, for example, performed by a computing device, such as a server. More particularly, the podmap formation process 500 can be performed by the podmap creator 114 of the application server 112 illustrated in FIG. 1 or the podmap creator 206 illustrated in FIG. 2.

The podmap formation process 500 begins with a decision 502. The decision 502 determines whether a podmap request has been received. Here, the server device monitors whether an incoming podmap request has been received from a requester. In one embodiment, the podmap request is sent to the server via the client 102 by the podmap request process 400. Typically, with respect to FIG. 1, the client program 104 operating on the client 102 would send a podmap request through the network 110 to the application server 112 requesting that the application server 112 create and return a podmap. In any case, when the decision 502 determines that a podmap request has been received, map information for the podmap is requested 504. In one embodiment, the map information is requested from a map server, such as the map server 116 illustrated in FIG. 1 or the map server 202 illustrated in FIG. 2. In one embodiment, the map information being requested 504 is based on a determined route from the start location to the destination location. In such case, the podmap request includes at least the start location and the destination location. In another embodiment, the podmap request might only require a destination location, such as when the start location is already known or otherwise available to the server.

After the map information has been requested 504, a decision 506 then determines whether the map information has been received. When the decision 506 determines that the map information has not been received, then the podmap formation process 500 can await the map information. Once the decision 506 determines that the map information has been received, the podmap formation process 500 continues. In one embodiment, the map information includes at least text directions and one or more map images. When the podmap formation process 500 continues, the text directions of the map information are caused 508 to be converted to voice directions. As an example, the server (e.g., application server 112) can forward the text directions to a TTS server and receive back voice directions corresponding to the text directions. The TTS server can, for example, be the TTS server 118 illustrated in FIG. 1 or the TTS engine 204 illustrated in FIG. 2.

Next, a podmap is caused 510 to be formed based on the voice directions and the map images. The podmap thus provides audio and visual components. The audio components are based on the voice directions, and the visual components are associated with the map images. In one embodiment, the podmap is such that on playback on a computing device (i.e., media playback device) having a display screen, the display of the map images can be controlled with regard to the particular voice directions being output by the audio. In other words, the different map images are able to be automatically displayed at different times so as to properly correspond to the voice directions being output as audio. After the podmap has been caused 510 to be formed, the podmap is stored 512 at a subscription server. For example, the subscription server can pertain to the podmap RSS server 120 illustrated in FIG. 1 or the RSS server 212 illustrated in FIG. 2. Thereafter, the requester can be notified 514 that the podmap is available. The requester can pertain to the client (e.g., client 102), a client program (e.g., client program 104) or a user of the client or client program. Following the block 514, the podmap formation process 500 is complete and ends.

According to another embodiment, in forming a podmap, travel times for the different segments can be estimated and used to control the transitioning to subsequent segments. For example, if a segment covers a distance of 2.0 miles and the user is in an automobile traveling at an estimated speed of 20 miles per hour, then the travel time for segment is estimated to take 6 minutes. In such case, if the play duration for the corresponding segment is 1 minute, a 5 minute pause period can be provided in the podcast after the segment so that the output of the audio for the next segment is delayed until appropriate. Hence, the segments are played such that they coordinated with the user's estimated position. In the event that the playback is too fast or too slow, such as due to traffic or other deviations from the estimated travel time for the segment, a user of the playback device can pause, stop or backup the playback so as to realign the map information being played back with the user's current location. For example, in one implementation, backup of playback can be done on a per segment basis to retain the complete navigation instruction (e.g., return to beginning of the current or previous segment). Although it is assumed that the travel time is based on automobile travel, optionally, the travel times can be for other modes of transportation, including train, bus, bicycle, walking, running, etc.

In one embodiment, if there are pause periods between playing segments, the pause periods can be filled with other content. For example, the pause periods can be filled by playing music, which is often available on a media playback device. As another example, advertisements can be presented on the media playback device during the pause periods, such advertisements can include one or more of text, audio or video. Although a media playback device might be able to concurrently output the map information and other content (music, ads, etc.), during the pause periods, audio can be used for the other content and/or more area of a display screen may be utilized to display the other content.

Figure 6:
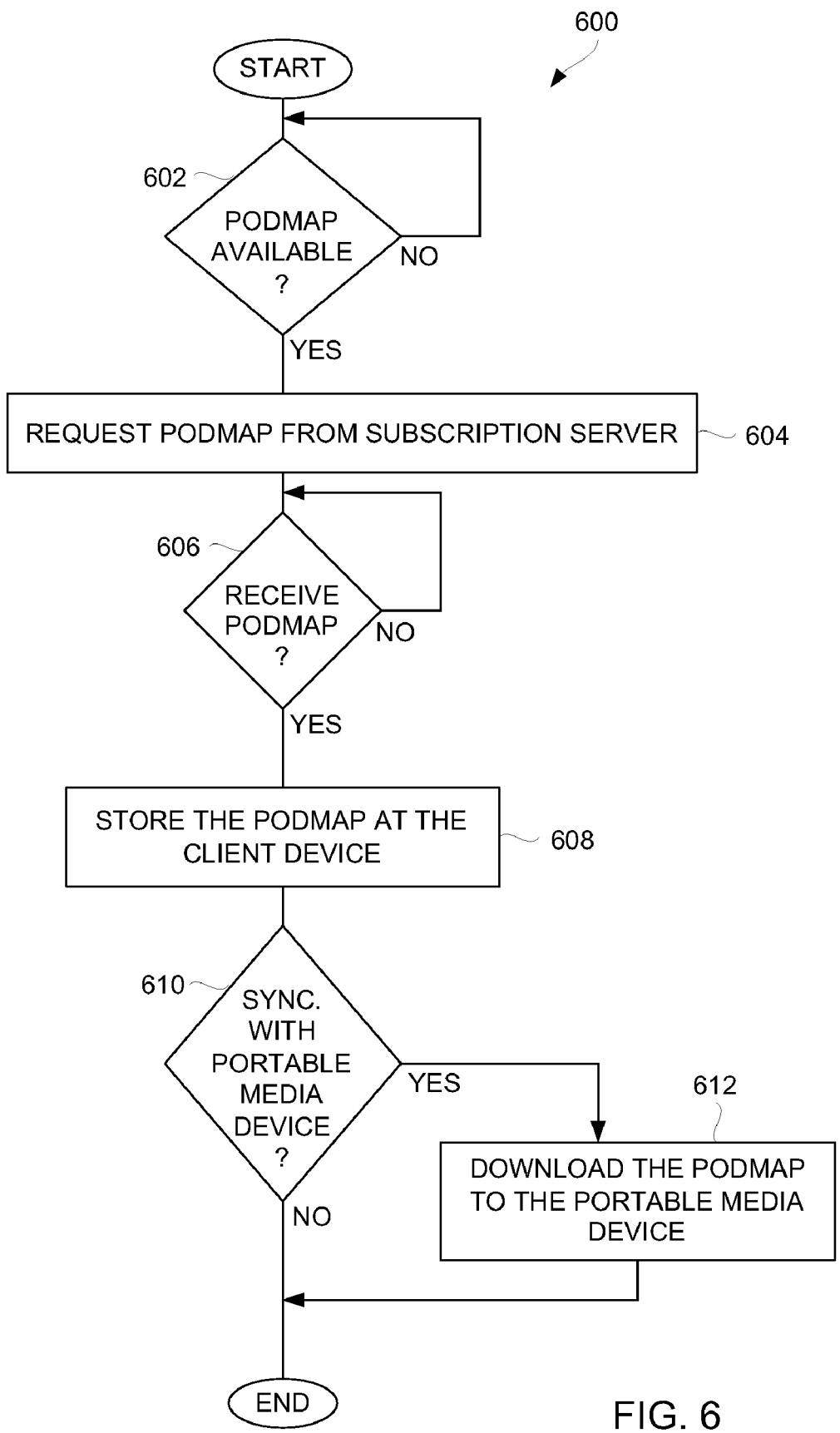
FIG. 6 is flow diagram of a podmap delivery process according to one embodiment of the invention.

FIG. 6 is flow diagram of a podmap delivery process 600 according to one embodiment of the invention. The podmap delivery process 600 is, for example, performed by a client program operating on a client. The client, for example, can be the client 102 illustrated in FIG. 1 or the client 210 illustrated in FIG. 2.

The podmap delivery process 600 begins with a decision 602. The decision 602 determines whether a podmap is available. The decision 602 can be performed by a periodic polling of an appropriate subscription server or can be performed in response to being notified that a podmap is newly available or updated at the appropriate subscription server. For example, the podmap formation process 500 can notify the client that the podmap is available. In any case, when the decision 602 determines that a podmap is not available, the podmap delivery process 600 awaits the availability of a podmap. On the other hand, when the decision 602 determines that a podmap is available, the podmap delivery process 600 continues. In other words, the podmap delivery process 600 can be deemed to be invoked when a podmap becomes available.

Once a podmap is determined to be available, the podmap is requested 604 from the subscription server. A decision 606 then determines whether the podmap has been received. When the decision 606 determines that the podmap has not been received, then the podmap delivery process 600 awaits the receipt of the podmap. Once the podmap has been received, the podmap can be stored 608 at the client device (e.g., client 102 or 210).

Next, a decision 610 can determine whether synchronization with a portable media device is to be performed. Synchronization can be performed automatically by the client device or can be performed on-demand from a user of the client device. In any case, when the decision 610 determines that synchronization with the portable media device is to be performed, the podmap is downloaded 612 to the portable media device. In order to download the podmap to the portable media device, the portable media device must be able to communicate with the client device. For example, the portable media device can be connected to the client device by way of (i) direct coupling, (ii) a cable, or (iii) wireless link. Once on the portable media player, the user of the portable media player can start its playback. Once played, the map-based media item provides audio and/or graphical outputs for the user. The audio and/or graphical outputs are the map information that assists the user in transitioning from the start location to the destination location. Following the block 612, as well as following the decision 610 when synchronization is not to be performed, the podmap delivery process 600 ends.

Note that a podmap can be considered a podcast or one or more episodes of a podcast. Hence, a reference as used herein to a podmap may refer to a podmap as a whole or one or more episodes of a podmap.

In the various processes discussed above with reference to FIGS. 3-6, decision blocks are represented. Although the process are indicated as waiting for the condition of the decision to be satisfied, in the event that the decision condition(s) is not satisfied in a timely fashion, the corresponding process could time-out. Alternatively, the corresponding process can be implemented by a separate process (or thread) that can be utilized to await the condition(s) of the decision to be satisfied.

For additional organization and management of podmaps, the podmaps can be stored at the subscription server in accordance with registered user accounts. For example, a user account can be accessed if the requester can provide the appropriate user name and password. Additionally, created podmaps when stored to the subscription server can be stored so that they are associated with a particular user account. As an example, a user may have a "my maps" podcast stored at the subscription server which can be downloaded as appropriate to the client device associated with the user. In one embodiment, any subsequent requests for podmaps by that user would be stored to the "my maps" podcast as additional episodes.

In addition, for management of podmaps, a client device or a portable media device can also be configured so that the podmaps are automatically maintained or discarded based on any of a number of different criteria. For example, the number of podmaps (or episodes thereof) being maintained could be limited and the oldest stored podmap can be deleted when more than the predetermined number of podmaps (or episodes thereof) is being stored. As another example, the deletion of podmaps (or episodes thereof) can be based on usage so that those podmaps (or episodes thereof) that have not been used for an extended period of time can be automatically deleted. Still further, a user can set preferences to control how the podmaps are maintained by the client device or the portable media device.

Although the discussion above focuses on creation, management and delivery of map-based media, such as a podmap, the invention extends beyond creation, management and delivery of map-related information. Indeed, the invention is applicable to any type of media content that can be organized into a podcast and be provided to a client device.

The clients and the portable media devices and their operations discussed above can be used within a media system that supports purchase, management and usage of media assets.

Figure 7:
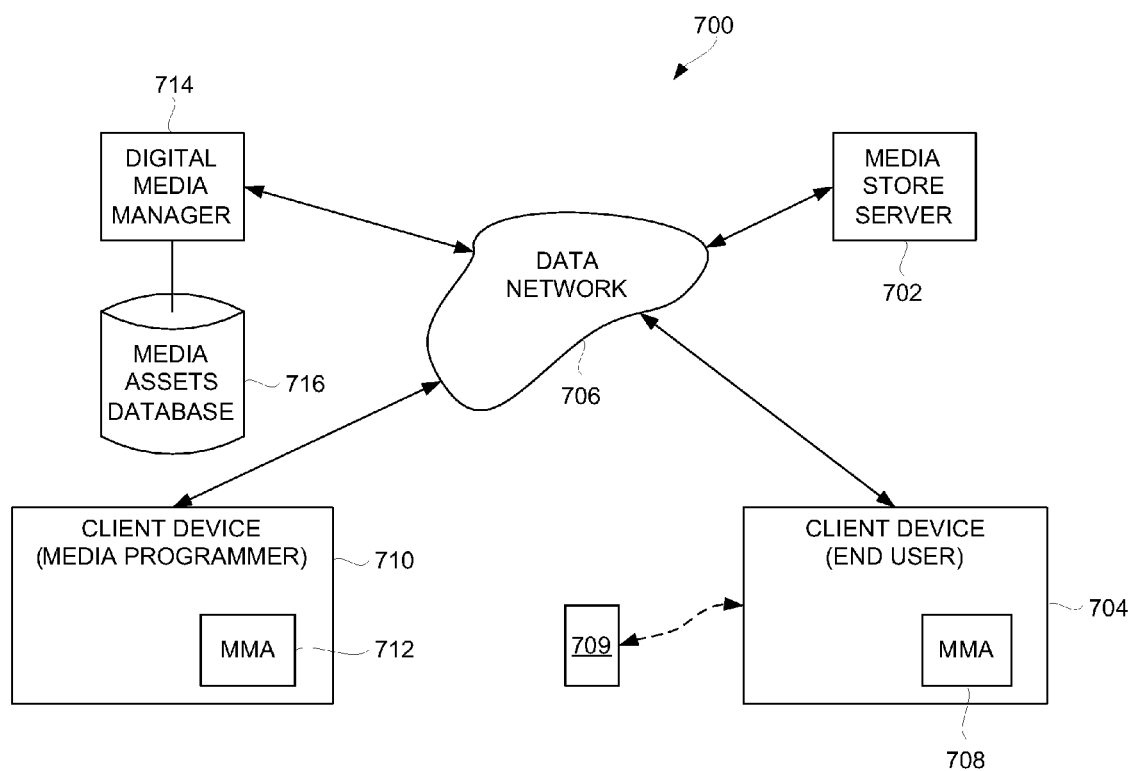
FIG. 7 is a block diagram of a media system according to one embodiment of the invention.

FIG. 7 is a block diagram of a media system 700 according to one embodiment of the invention. The media system 700 can be used in conjunction with the map-based media system 100 illustrated in FIG. 1.

The media system 700 includes a media store server 702 that hosts an on-line media store. The media store server 702 can off-load commerce transactions and/or delivery of purchased digital media assets to other servers, if desired. As shown in FIG. 7, the media system 700 includes one or more client devices 704 for use by end users. The client devices 704 couple to a data network 706. Additionally, the media store server 702 also couples to the data network 706. In one implementation, the data network 706 can refer to one or more data networks, typically high data-bandwidth networks; namely, wired networks, such as the Internet, Ethernet, gigabit Ethernet, and fiber optic, as well as wireless networks such as IEEE 702.11 (a), (b) or (g) (WiFi), IEEE 702.16 (WiMax), and Ultra-Wide Band (UWB).

A computer program 708, typically a media management application (MMA) or other media player application, runs on the client device 704. One example of a media management application is the iTunes® application, produced by Apple Computer, Inc. of Cupertino, Calif. The client devices 704 are, in general, computing devices. As an example, the client devices 704 can be specific or general-purpose personal computers or portable media players. The client device can couple to a portable media device 709 (portable media player). One example of a portable media player suitable for use with the invention is the iPod®, also produced by Apple Computer, Inc. The computer program 708 can be used by a consumer for a variety of purposes, including, but not limited to, browsing, searching, acquiring and/or purchasing media assets (including podcasts) from the on-line media store provided by the media store server 702, creating and sharing media asset groups (e.g., playlists), organizing media assets, presenting/playing media assets, transferring media assets between client devices 704, and synchronizing with portable media devices. In relation to the map-based media system 100, the client device 704 corresponds to the client 102, the computer program 708 corresponds to the client program 104, the data network 706 corresponds to the network 110, and the portable media player 709 corresponds to the portable media device 106.

The media system 700 can also include one or more client devices 710 for use by media programmers. The client devices 710 also run a computer program 712, typically a media management application (MMA) or other media player application. The computer program 712 can enable a media programmer to create and publish podcasts.

The media system 700 also includes a digital asset manager 714. The digital asset manager 714 is coupled to a media assets database 716. The media assets database 716 stores media asset information including metadata relating to digital media assets available for purchase at the on-line media store. The metadata can pertain to individual media assets (digital media assets) or media asset groups (digital media asset groups). Media assets can include, but are not limited to, music, video, text, and/or graphics files. One particular type of media asset is a podcast, which often includes audio, graphics and text (but could also include video). In the case of music, a media asset group can be a playlist for the music.

The media store server 702 enables the user of a particular client device 704 to acquire media assets (e.g., podcasts). Subsequently, the client device 704 can download the media assets from the media store server 702 or some other server via the data network 706. As will be understood by those familiar with data networks, other network configurations are possible. Furthermore, while the media store server 702 and the digital asset manager 714 are shown as individual and separate devices, it will be understood by those familiar with the art that other configurations are possible. As one example, each device can be implemented such that it is distributed over multiple server computers. As another example, these various servers and/or managers can be implemented by a single physical server computer.

The portable media device as described herein can be a media player capable of playing (including displaying) media items. The media items can pertain to audio items (e.g., audio files or songs), videos (e.g., movies) and/or images (e.g., photos). Examples of particular types of media item include podcasts and podmaps.

Figure 8:
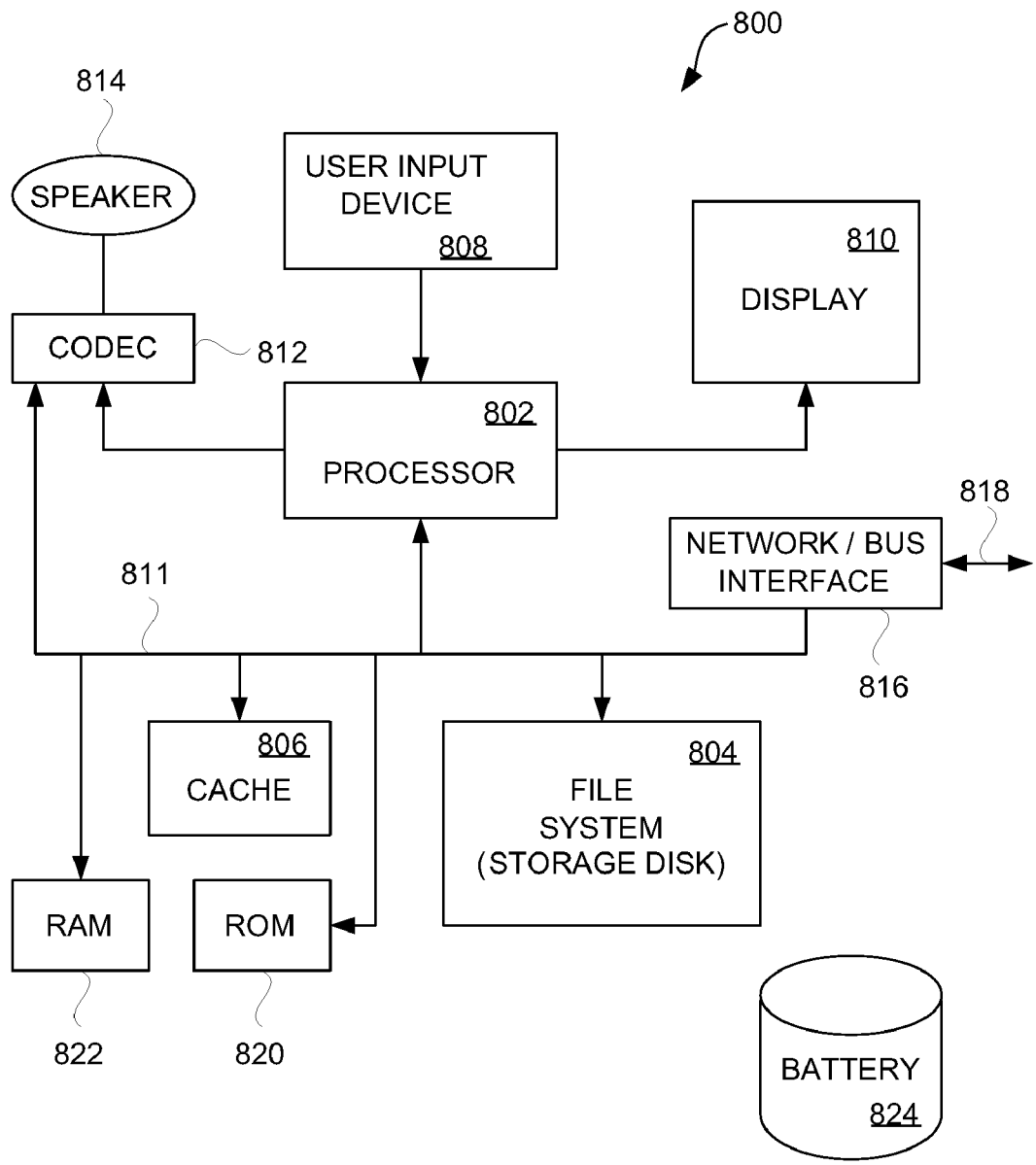
FIG. 8 is a block diagram of a media player suitable for use with the invention.

FIG. 8 is a block diagram of a representative media player 800 suitable for use with the invention. The media player 800 illustrates circuitry of a representative portable media device (e.g., portable media device 106, 706).

The media player 800 includes a processor 802 that pertains to a microprocessor or controller for controlling the overall operation of the media player 800. The media player 800 stores media data pertaining to media items in a file system 804 and a cache 806. The file system 804 is, typically, a storage device, such as a FLASH memory or one or more storage disks. The file system 804 typically provides high capacity storage capability for the media player 800. However, since the access time to the file system 804 is relatively slow, the media player 800 can also include a cache 806. The cache 806 is, for example, Random-Access Memory (RAM) provided by semiconductor memory. The relative access time to the cache 806 is substantially shorter than for the file system 804. However, the cache 806 does not have the large storage capacity of the file system 804. Further, the file system 804, when active, consumes more power than does the cache 806. The power consumption is often a concern when the media player 800 is a portable media player that is powered by a battery (not shown). The media player 800 also includes a RAM 820 and a Read-Only Memory (ROM) 822. The ROM 822 can store programs, utilities or processes to be executed in a non-volatile manner. The RAM 820 provides volatile data storage, such as for the cache 806.

The media player 800 also includes a user input device 808 that allows a user of the media player 800 to interact with the media player 800. For example, the user input device 808 can take a variety of forms, such as a button, keypad, dial, touch surface, etc. Still further, the media player 800 includes a display 810 (screen display) that can be controlled by the processor 802 to display information to the user. A data bus 811 can facilitate data transfer between at least the file system 804, the cache 806, the processor 802, and the CODEC 812.

In one embodiment, the media player 800 serves to store a plurality of media items (e.g., songs, podcasts, etc.) in the file system 804. When a user desires to have the media player play a particular media item, a list of available media items is displayed on the display 810. Then, using the user input device 808, a user can select one of the available media items. The processor 802, upon receiving a selection of a particular media item, supplies the media data (e.g., audio file) for the particular media item to a coder/decoder (CODEC) 812. The CODEC 812 then produces analog output signals for a speaker 814. The speaker 814 can be a speaker internal to the media player 800 or external to the media player 800. For example, headphones or earphones that connect to the media player 800 would be considered an external speaker.

The data link 818 allows the media player 800 to couple to a host computer, power source or accessory device. Depending on application, the data link 818 can be provided over a wired connection or a wireless connection. In the case of a wireless connection, the network/bus interface 816 can include a wireless transceiver.

The media items (media assets) can pertain to one or more different types of media content. In one embodiment, the media items are audio tracks (e.g., songs, audiobooks, podcasts). In another embodiment, the media items are images (e.g., photos). However, in other embodiments, the media items can be any combination of audio, graphical or video content.

Additionally, the following applications are hereby incorporated herein by reference: (i) U.S. patent application Ser. No. 11/166,333, filed Jun. 25, 2005, and entitled "TECHNIQUES AND SYSTEMS FOR SUPPORTING PODCASTING;" (ii) U.S. patent application Ser. No. 11/166,331, filed Jun. 25, 2005, and entitled "TECHNIQUES AND SYSTEMS FOR SUPPORTING PODCASTING;" (iii) U.S. patent application Ser. No. 11/166,332, filed Jun. 25, 2005, and entitled "ACQUISITION, MANAGEMENT AND SYNCHRONIZATION OF PODCASTS;" (iv) U.S. patent application Ser. No. 11/369,480, filed Mar. 6, 2006, and entitled "MEDIA PRESENTATION WITH SUPPLEMENTARY MEDIA;" and (v) U.S. patent application Ser. No. 10/277,418, filed Oct. 21, 2002, and entitled "INTELLIGENT INTERACTION BETWEEN MEDIA PLAYER AND HOST COMPUTER."

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that personalized podcasts can be created and delivered to particular requesters. Another advantage of the invention is that map-based data can be created and delivered as a podcast. The map-based data is then portable and can easily travel with the user. Another advantage of the invention is that personalized podcasts or map-based data can be managed and maintained on media playback devices.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for forming a map-based media item, said method comprising:
   (a) receiving a request for a map-based media item pertaining to mapping a route from a start location to a destination location;
   (b) obtaining map information based on a determined route from the start location to the destination location, the map information including text directions and at least one map image;
   (c) causing the text directions to be converted into voice directions; and
   (d) forming the map-based media item using at least the voice directions and the at least one map image,
   wherein the map information includes a plurality of map images,
   wherein, within the map-based media item, the map images are synchronized with the corresponding portions of the voice directions such that, when the map-based media item is presented, the map images are presented synchronized with the presentation of the corresponding portions of the voice directions, and
   wherein the map-based media item is a podcast that includes an electronic file that interrelates the map images and synchronized audio, the synchronized audio providing the voice directions.

2. A computer-implemented method as recited in claim 1, wherein said method further comprises:
   (e) providing the map-based media item to a media playback device.

3. A computer-implemented method as recited in claim 1, wherein the request for the map-based media item is from a client program operating on a client device, and
   wherein said method further comprises:
   (e) providing the map-based media item to the client device.

4. A computer-implemented method as recited in claim 3, wherein the client device is a media playback device.

5. A computer-implemented method as recited in claim 3, wherein said method further comprises:
   (f) transferring the map-based media item from the client device to a portable media playback device.

6. A computer-implemented method as recited in claim 5, wherein the portable media playback device is a handheld device.

7. A computer-implemented method as recited in claim 1, wherein the map information is obtained from a map server.

8. A computer-implemented method as recited in claim 7, wherein said obtaining (b) includes at least:
   (b1) sending a request for map information to the map server, the map request including at least the start location and the destination location; and
   (b2) receiving the map information from the map server.

9. A computer-implemented method as recited in claim 1, wherein said causing (c) includes at least:
(c1) sending a request to a text-to-speech (TTS) server, the request to the TTS server providing the text directions and requesting conversion into the voice directions; and
(c2) receiving the voice directions from the TTS server.

10. A computer-implemented method as recited in claim 1, wherein the map images are an ordered set of map images.

11. A computer-implemented method as recited in claim 1, wherein the podcast includes at least one episode.

12. A computer-implemented method as recited in claim 1, wherein the map-based media item is produced specially for the requestor and only accessible by the requestor.

13. A computer-implemented method for providing a map-based media item to a portable media playback device, said method comprising:
(a) receiving a request for a map-based media item pertaining to mapping a route from a start location to a destination location;
(b) obtaining map information based on a determined route from the start location to the destination location, the map information including text directions and a plurality of map images;
(c) causing the text directions to be converted into voice directions;
(d) forming a map-based media item from the voice directions and the map images, the map images being synchronized with the corresponding portions of the voice directions such that, when the map-based media item is presented, the map images are presented synchronized with the presentation of the corresponding portions of the voice directions; and
(e) rendering the map-based media item available to be provided to the portable media playback device,
wherein the map-based media item pertains to a podcast.

14. A computer-implemented method as recited in claim 13, wherein the request for the map-based media item is from a client, and
wherein said rendering (e) includes at least:
(e1) causing the map-based media item to be stored to a RSS server; and
(e2) providing, to the client, a network address pertaining to the map-based media item at the RSS server.

15. A computer-implemented method as recited in claim 14, wherein said method further comprises:
(f) retrieving the map-based media item from the RSS server using the network address.

16. A computer-implemented method as recited in claim 15, wherein said retrieving (f) comprises:
(f1) providing the network address to a RSS reader associated with the client;
(f2) subsequently causing the RSS reader to request some or all of the data at the RSS server for the map-based media item;
(f3) receiving the requested data for the map-based media content from the RSS server;
(f4) storing the requested data at the client; and
(f5) copying the requested data from the client to the portable media playback device.

17. A non-transitory computer-readable storage medium including at least computer program code stored thereon and executable by a computing device for providing a map-based media item to a media playback device, said computer-readable medium comprising:
computer program code for receiving a request for a map-based media item pertaining to mapping a route from a start location to a destination location;
computer program code for obtaining map information based on a determined route from the start location to the destination location, the map information including text direction segments and a plurality of map images;
computer program code for causing the text direction segments to be converted into voice direction segments; and
computer program code for forming the map-based media item using at least the voice direction segments and the map images,
wherein, within the map-based media item, the map images are synchronized with the voice direction segments corresponding thereto such that, when the map-based media item is presented, the map images are presented synchronized with the presentation of the voice direction segments, and
wherein the map-based media item is a podcast that includes an electronic file that interrelates the map images and synchronized audio, the synchronized audio providing the voice directions.

18. A non-transitory computer-readable storage medium as recited in claim 17, wherein said computer readable medium further comprises:
computer program code for providing the map-based media item to a media playback device.

19. A non-transitory computer-readable storage medium as recited in claim 17, wherein the request for the map-based media item is from a client program operating on a client device,
wherein said computer-readable medium further comprises:
computer program code for providing the map-based media item to the client device, and
wherein the client device is a media playback device.

20. A non-transitory computer-readable storage medium as recited in claim 19, wherein said computer-readable medium further comprises:
computer program code for transferring the map-based media item from the client device to a portable media playback device.

21. A non-transitory computer-readable storage medium as recited in claim 17, wherein the map information is obtained from a map server.

22. A non-transitory computer-readable storage medium as recited in claim 21, wherein said computer program code for obtaining includes at least:
computer program code for sending a request for map information to the map server, the map request including at least the start location and the destination location; and
computer program code for receiving the map information from the map server.

23. A non-transitory computer-readable storage medium as recited in claim 17, wherein said computer program code for causing includes at least:
computer program code for sending a request to a text-to-speech (TTS) server, the request to the TTS server providing the text directions and requesting conversion into the voice directions; and
computer program code for receiving the voice directions from the TTS server.

24. A non-transitory computer-readable storage medium as recited in claim 17, wherein the map information includes a plurality of map images, the map images being at least partially synchronized with the corresponding portions of the voice directions.

25. A non-transitory computer-readable storage medium as recited in claim 24, wherein the map images are an ordered set of map images.

26. A computer-implemented method for providing map-based media data to a client device, said method comprising:
   (a) requesting map-based media data from a remote server, the map-based media data pertaining to mapping a route from a start location to a destination location;
   (b) receiving an indication that the map-based media data that has been requested has been made available on a subscription server;
   (c) requesting the map-based media data from the subscription server;
   (d) receiving at least a portion of the map-based media data from the subscription server in response to said requesting (c);
   (e) storing the received map-based media data;
   (f) subsequently downloading the received map-based media data to a portable media playback device; and
   (g) presenting the map-based media data on the portable media playback device, wherein said presenting (g) of the map-based media data interrelates map images with synchronized audio directions,
   wherein the map-based media data is provided as a podcast.

27. A computer-implemented method as recited in claim 26, wherein said requesting (c) is performed periodically, conditionally or on-demand.

28. A computer-implemented method as recited in claim 26, wherein said requesting (a) comprises:
   (a1) displaying a map-based media request dialog at the client device;
   (a2) receiving to and/or from information for the map-based media item being requested by the map-based media request dialog;
   (a3) forming a map-based media request; and
   (a4) sending the map-based media request to the remote server.

29. A computer system, comprising:
a processor for executing computer program code to form one or more map-based media items; and
a data storage device that stores one or more map-based media items and the computer program code,
wherein the computer program code includes at least:
   computer program code for obtaining map information based on a route from the start location to a destination location, the map information including text direction segments and a plurality of map images;
   computer program code for causing the text direction segments to be converted into voice direction segments; and
   computer program code for forming the map-based media item using at least the voice direction segments and the map images,
wherein, within the map-based media item, the map images are synchronized with the voice direction segments corresponding thereto such that, when the map-based media item is presented, the map images are presented synchronized with the presentation of the voice direction segments, and
wherein the map-based media item is a podcast that includes an electronic file that interrelates the map images and synchronized audio, the synchronized audio providing the voice directions.

* * * * *